United States Patent [19]

Stryker et al.

[11] Patent Number: 4,785,625

[45] Date of Patent: Nov. 22, 1988

[54] DUCTED FAN GAS TURBINE POWER PLANT MOUNTING

[75] Inventors: Howard Y. Stryker, Glastonbury, Conn.; Thomas Steel, Derby, England

[73] Assignees: United Technologies Corporation, Hartford, Conn.; Rolls Royce, London, England

[21] Appl. No.: 35,815

[22] Filed: Apr. 3, 1987

[51] Int. Cl.[4] ............................ F02K 3/04; F02C 7/20
[52] U.S. Cl. ...................................... 60/226.1; 60/39.32
[58] Field of Search ................. 60/226.1, 39.31, 39.32, 60/262; 244/54; 248/554, 555; 415/134, 136, 138

[56] References Cited

U.S. PATENT DOCUMENTS

| | | | |
|---|---|---|---|
| 2,693,371 | 11/1954 | Nelson | 60/39.32 |
| 2,943,449 | 7/1960 | Kurti | 60/39.32 |
| 3,327,473 | 6/1967 | Smith | 60/39.31 |
| 3,792,586 | 2/1974 | Kasmarik et al. | 60/226.1 |
| 3,830,058 | 8/1974 | Ainsworth | 60/226.1 |
| 4,044,973 | 8/1977 | Moorhead | 244/54 |
| 4,683,717 | 8/1987 | Naud | 60/39.32 |

FOREIGN PATENT DOCUMENTS 2168755  6/1986  United Kingdom .............. 60/39.31

*Primary Examiner*—Donald E. Stout
*Attorney, Agent, or Firm*—Troxell K. Snyder

[57] ABSTRACT

A ducted fan gas turbine powerplant is mounted to aircraft structure via a single plane mounting which comprises a single peripheral array of struts which connect the core gas generator, the fan cowl and the aircraft structure. The structure which connects the struts to the core gas generator is extended downstream of the array of struts and terminates in a plain bearing. A downstream portion of the core gas generator includes a cylindrical portion which is in sliding engagement with the plain bearing, so that radial forces generated by the movement arm, the fulcrum of which coincides with the strut connection with the core gas generator are transmitting via the struts to the aircraft structure and relative axial expansion between the extension and the core gas generator is enabled.

6 Claims, 3 Drawing Sheets

DUCTED FAN GAS TURBINE POWER PLANT MOUNTING

The present invention relates to ducted fan gas turbine powerplants and, more particularly, to support structures by means of which a ducted fan gas turbine powerplant is supported from an aircraft.

A ducted fan gas turbine powerplant comprises a fan air duct which surrounds a core gas generator. A cowl defines the outer wall of the fan air duct and one or more stages of fan blades rotate in the duct.

The cowl has to be supported in fixed spaced relationship with the core gas generator and the accepted way of achieving such support, is by way of struts in the form of hollow aerofoils which extend radially across the duct, at a position downstream of the fan stage or stages.

The uppermost strut, when the powerplant is in situ on an aircraft, is commonly extended rearwards ie in a downstream direction within the fan duct so as to cover first links which connect a forward part of the powerplant to the aircraft, and further links downstream thereof which connect a rearward or downstream position of the powerplant to the associated aircraft. Such an arrangement provides a considerable blockage in the fan duct and exposes a large surface area to the fan air flowing therethrough. A considerable loss in efficiency is thus experienced.

Efforts have been made to reduce both the blockage and the surface area available for scrubbing by the fan air, by way of obviating both the upstream and downstream mounting linkage and supporting the powerplant from the aircraft via structure which is provided by way of rigid aerofoil struts or vanes at the upstream linkage position. This is known as a single plane mounting and is disclosed in U.S. Pat. No. 3,830,058.

Whilst the aforementioned US Patent achieves its object in the sense of reduced blockage and scrubbing surface, thereby reducing duct losses, it does impose a moment force of some considerable magnitude, on the joint between the struts and the structure to which they are attached, i.e. the core gas generator structure.

The present invention seeks to provide a ducted fan gas turbine powerplant including improved mounting means.

According to the present invention a ducted fan gas turbine powerplant includes a unitary structure comprising a plurality of mounting struts affixed by their radially inner ends to an annular strengthened outer casing portion of a core gas generator of the powerplant in peripheral alignment thereon, and extending radially across the fan duct, a box structure which incorporates the radially outer ends of the struts and is fastened to aircraft structure so as to transmit powerplant loads via said struts to said aircraft structure, wherein the improvement comprises an annular portion of the strengthened outer casing which extends downstream of the struts, an annular portion at the downstream end of said extension and which has a radially inner plain bearing surface, a cylindrical member affixed to the core gas generator and extending towards said downstream annular portion and having an end portion which includes a radially outer plain bearing surface which nests within said downstream annular portion in close axial sliding relationships therewith.

The invention will now be described, by way of example and with reference to the accompanying drawings in which.

Figure 1:
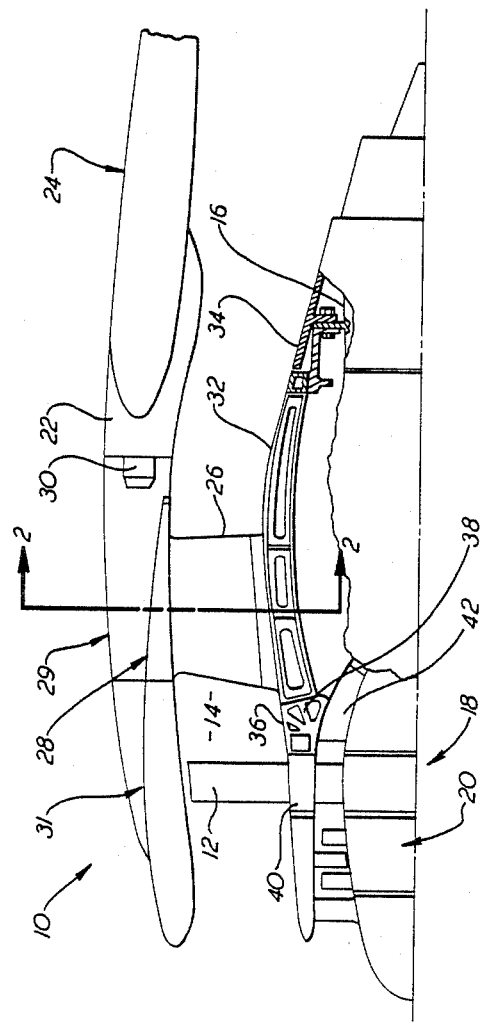
FIG. 1 is a diagrammatic, part cross-sectional view of a ducted fan, gas turbine powerplant in accordance with the present invention.

Referring to FIG. 1. A ducted fan gas turbine powerplant 10 provides a stage of fan blades 12 which are rotatable in a fan duct 14 and driven by a turbine (not shown) which is contained within the casing 16 of a core gas generator 18. The turbine (not shown) is driven in the usual way by gases from combustion equipment (not shown) in the core gas generator 18. A compressor 20 is also driven by a turbine (not shown) and provides compressed air to the combustion equipment (not shown) in known manner.

The ducted fan gas turbine powerplant 10 is mounted on a pylon 22 which in turn is connected in known manner to an aircraft wing 24.

The mounting is achieved via a number of struts 26 (in the present example three) which are robustly constructed of metal, and the wall thickness of the struts 26 is greater than the wall thickness of the remaining struts which are not shown in FIG. 1 but which will be described hereinafter. The radially outer ends of the struts 26 are joined e.g. by electron beam welding, to an annular double walled structure 28 which also forms an axial portion of the fan cowl 31.

The structure 28 forms part of a welded box structure 29 which in turn is in abutting relationship with the upstream end of the pylon 22. A pair of dowels 30 in the end face of the pylon 22 locate within the box structure 29 and serve the dual purpose of ensuring accurate alignment of the mating parts and acting to counter any torque loads in the mounting structure.

The radially inner ends of the struts 26 are welded to a double walled very stiff casing 32, again made from a metal, the thickness of which is greater than sheet metal casings which normally encase a core gas generator. The casing 32 is annular and forms an axial portion of the outer casing of the core gas generator 16. The remainder of the downstream portion of the core gas generator outer casing 34 is constructed from the said sheet metal.

The upstream end of the casing 32 is bolted to an annular casing 36 having internal stiffening ribs 38 and which is in air sealing relationships with the downstream face of the disc 40 of the relatively rotatable fan stage 12.

The casing 36 is integral with the annular diffuser passage structure 42 which carries internal thrust and/or roller bearings (not shown) for supporting the shaft connections between the turbine (not shown) the fan stage 12 and the compressor 20 in known manner.

Figure 2:
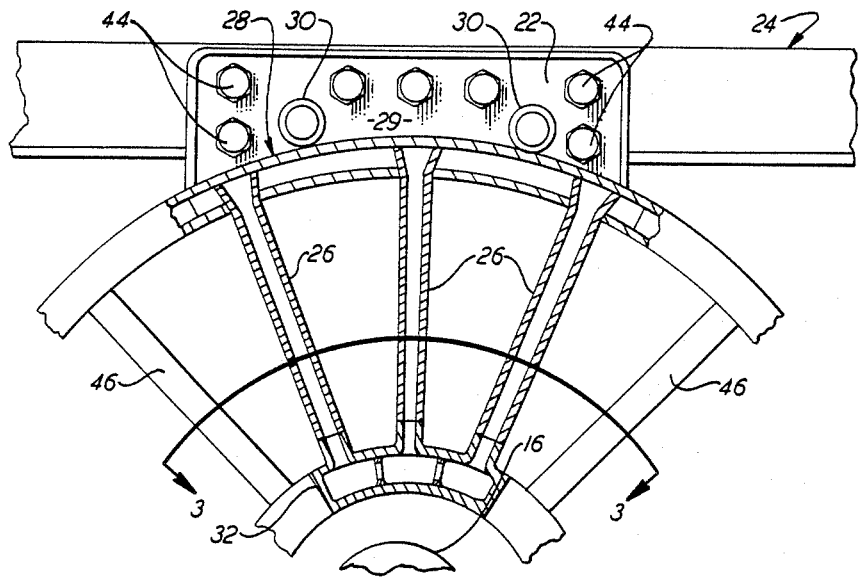
FIG. 2 is an enlarged view on line 2—2 of FIG. 1.

Referring now to FIG. 2. In the present example, three load supporting struts 26 are constructed in a unified group, so as to share in transmitting the deadweight and working loads of the powerplant 10 to the aircraft wing 24, via the structures 28,29 and 22. As is seen, whilst the dowels 30 locate the box structure 29 and therfor the powerplant 10, with respect to the pylon 22, the bolts 44 hold the assembly together.

The remaining struts 46 are utilised only to support the remainder of the fan cowl portion 31 in spaced relationship with the core gas generator 16.

Figure 3:
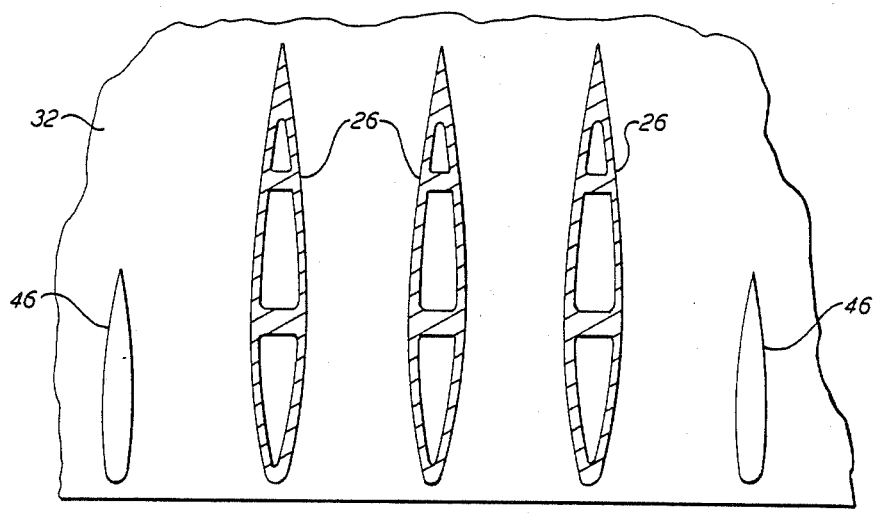
FIG. 3 is a view on line 3—3 of FIG. 2.

As is seen by referring to FIG. 3, the load supporting struts 26 are chordally longer than the remaining struts 46. Moreover, their wall thickness is also greater. This particular form is of course merely representative as the man skilled in the art, having read this specification, will devise struts the dimensions of which will be appropriate for the struts to support and transmit the deadweight and working loads generated by a particular powerplant, to the aircraft structure.

Figure 4:
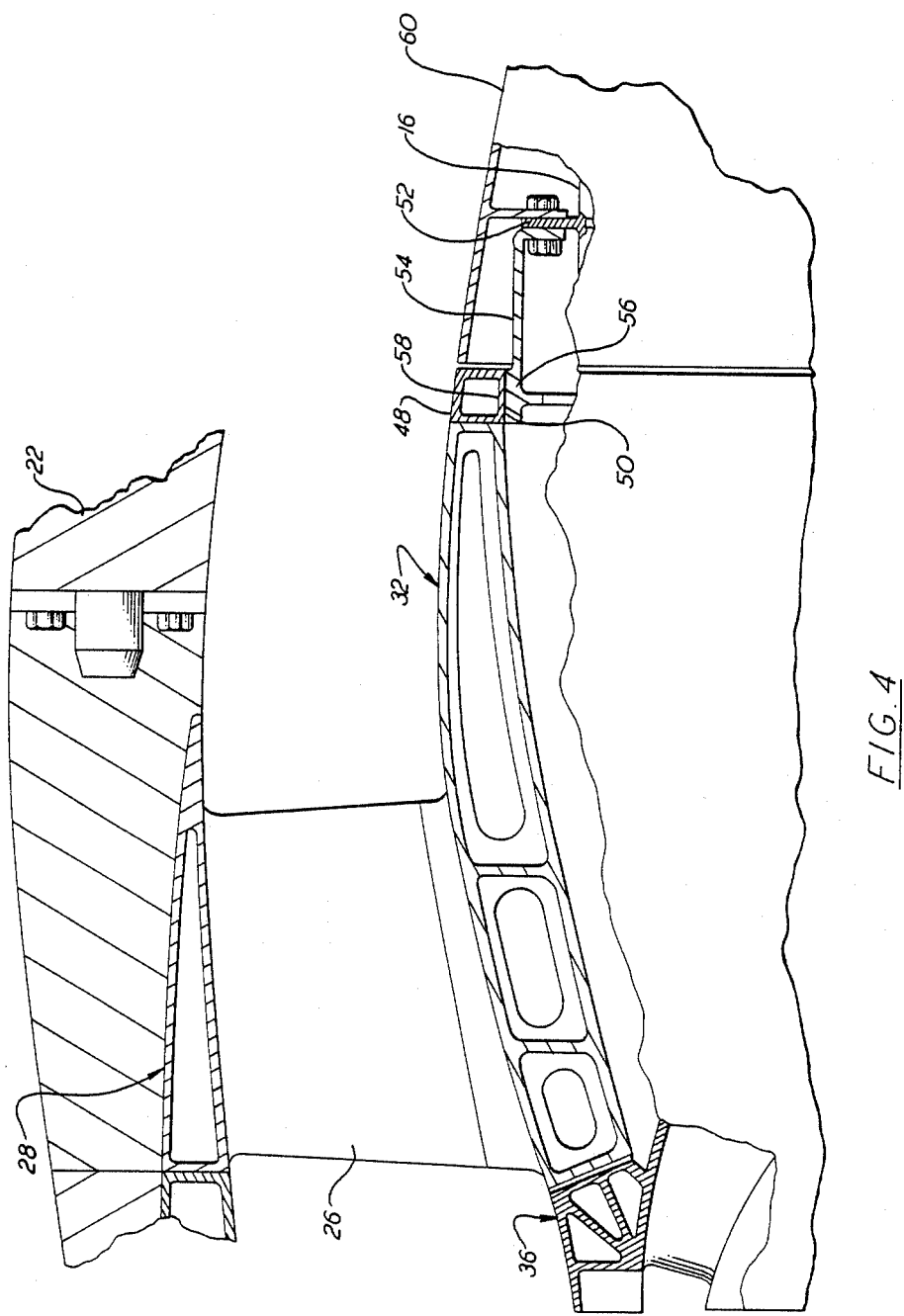
FIG. 4 is an enlarged part view of FIG. 1.

Referring now to FIG. 4. As described hereinbefore, the stiff casing 32 forms a portion of the outer casing of the core gas generator 16 and is fastened thereto via the annular casing 36, that being the only fixed joint between the core gas generator 16 and the structure consisting of the portion 32, the struts 26 and the cowl portion 28. The casing portion 32 however, extends downstream of the struts 26 and terminates in a stiff, annular ring 48, the radially inner surface of which is a plain bearing surface 50. The core gas generator 16 has an annular flange 52 from which a cylindrical member 54 projects towards the stiff ring 48 and terminates in a thickened portion 56, the outer surface of which is a plain bearing surface 58.

The cylindrical member 54 is sufficiently flexible as to enable differential expansion in the radial sense to occur between the core gas generator and the stiff casing 32 without overstressing either of the structures, and further, enables the bearing surfaces 50 and 58 to engage in axial sliding relationships, with the result that the core gas generator is supported in the radial sense, at a position downstream of the main mounting structure and without the employment of links which if present, would extend across the fan duct to the pylon 22. The generator of efficiency losses of the kind understood by those skilled in the art, is thus avoided.

The flange 52 also carries a sheet metal casing 60 which provides the downstream portion of the casing which surrounds the core gas generator 16.

We claim:

1. A ducted fan gas turbine powerlant including a unitary structure comprising a plurality of mounting struts affixed by their radially inner ends to an annular strengthened outer casing portion of a core gas generator of the powerplant in peripheral alignment thereon and extending radially across the fan duct, a box structure which incorporates the radially outer ends of the struts and is fastened to aircraft structure so as to transmit powerplant loads via said struts to said aircraft structure and wherein the improvement comprises an annular portion of the strengthened outer casing which extends downstream of the struts, an annular portion at the downstream end of said extension and which has a radially inner plain bearing surface, a cylindrical member affixed to the core gas generator and extending towards said downstream annular portion and having an end portion which includes a radially outer plain bearing surface which nests within said downstream annular portion in close axial sliding relationship therewith.

2. A ducted fan gas turbine powerplant as claimed in claim 1 and comprising at least three mounting struts.

3. A ducted fan gas turbine powerplant as claimed in claim 1 wherein said cylindrical member extends in an upstream direction towards said downstream annular portion so as to enable said close sliding engagement.

4. A ducted fan gas turbine powerplant as claimed in claim 2 wherein said cylindrical member extends in an upstream direction towards said downstream annular portion so as to enable said close sliding engagement.

5. A ducted fan gas turbine powerlant including a unitary structure comprising a plurality of mounting struts affixed by their radially inner ends to an annular strengthened outer casing portion of a core gas generator of the powerplant in peripheral alignment thereon and extending radially across the fan duct, a box structure which incorporates the radially outer ends of the struts and is fastened to aircraft structure so as to transmit powerplant loads via said struts to said aircraft structure and wherein the improvement comprises
   an annular portion of the strengthened outer casing which extends downstream of the struts,
   an annular portion at the downstream end of said extension and which has a radially inner plain bearing surface,
   a cylindrical member affixed to the core gas generator and extending towards said downstream annular portion and having an end portion which includes a radially outer plain bearing surface which nests within said downstream annular portion in close axial sliding relationship therewith,
   wherein said cylindrical member extends in an upstream direction towards said downstream annular portion so as to enable said close sliding engagement, and
   wherein said cylindrical member comprises a cylinder having a radially inwardly turned annular flange at one end, via which the cylindrical member is affixed to a corresponding flange on the core gas generator, and a thickened portion on the other, upstream end, which thickened portion is provided with the radially outer plain bearing surface.

6. A ducted fan gas turbine powerplant including a unitary structure comprising a plurality of mounting struts affixed by their radially inner ends to an annular strengthened outer casing portion of a core gas generator of the powerplant in peripheral alignment thereon and extending radially across the fan duct, a box structure which incorporates the radially outer ends of the struts and is fastened to aircraft structure so as to transmit powerplants loads via said struts to said aircraft structure and wherein the improvement comprises
   an annular portion of the strengthened outer casing which extends downstream of the struts,
   an annular portion at the downstream end of said extension and which has a radially inner plain bearing surface,
   a cylindrical member affixed to the core gas generator and extending towards said downstream annular portion and having an end portion which includes a radially outer plain bearing surface which nests within said downstream annular portion in close axial sliding relationship therewith,
   wherein said cylindrical member extends in an upstream direction towards said downstream annular portion so as to enable said close sliding engagement, and
   wherein said cylindrical member comprises a cylinder having a radially inwardly turned annular flange at one end, via which the cylindrical member is affixed to a corresponding flange on the core gas generator, and
   a thickened portion at the other, upstream end, which thickened portion is provided with the radially outer plain bearing surface.

* * * * *